United States Patent
Schmidt et al.

(10) Patent No.: US 12,225,352 B2
(45) Date of Patent: Feb. 11, 2025

(54) AUDIO STREAMING DEVICE

(71) Applicant: Widex A/S, Lynge (DK)

(72) Inventors: Morten Schmidt, Lynge (DK); Soren Bredahl Greiner, Lynge (DK)

(73) Assignee: Widex A/S, Lynge (DK)

( * ) Notice: Subject to any disclaimer, the term of this patent is extended or adjusted under 35 U.S.C. 154(b) by 187 days.

(21) Appl. No.: 17/910,568

(22) PCT Filed: Feb. 22, 2021

(86) PCT No.: PCT/EP2021/054311
§ 371 (c)(1),
(2) Date: Sep. 9, 2022

(87) PCT Pub. No.: WO2021/180454
PCT Pub. Date: Sep. 16, 2021

(65) Prior Publication Data
US 2023/0188906 A1   Jun. 15, 2023

Related U.S. Application Data

(60) Provisional application No. 62/988,593, filed on Mar. 12, 2020.

(51) Int. Cl.
| H04R 25/00 | (2006.01) |
| G01P 15/08 | (2006.01) |
| G01P 15/18 | (2013.01) |

(52) U.S. Cl.
CPC ........ H04R 25/505 (2013.01); G01P 15/0891 (2013.01); G01P 15/18 (2013.01)

(58) Field of Classification Search
CPC ............................ H04R 25/505; H04R 25/407; H04R 2420/07; H04R 25/554; H04R 3/02;
(Continued)

(56) References Cited

U.S. PATENT DOCUMENTS

2006/0070439 A1\* 4/2006 Kwon .................... G11B 19/04
                                                              73/488
2009/0031803 A1\* 2/2009 Noda ...................... G01P 15/18
                                                              73/488
(Continued)

FOREIGN PATENT DOCUMENTS

| EP | 1 643 501 A2 | 4/2006 |
| EP | 1 850 138 A1 | 10/2007 |

(Continued)

OTHER PUBLICATIONS

International Search Report for PCT/EP2021/054311 dated, May 3, 2021 (PCT/ISA/210).

(Continued)

*Primary Examiner* — Angelica M McKinney
(74) *Attorney, Agent, or Firm* — Sughrue Mion, PLLC

(57) ABSTRACT

An audio streaming device for streaming an audio signal to at least one hearing assistive device (32). The audio streaming device comprises at least one input transducer (21), an electronic sensor device (28) adapted for sensing gravitational forces acting on the audio streaming device (20), and a transmitter (30) adapted for streaming audio from the at least one input transducer (21) to the at least one hearing assistive device (32). The audio streaming device (20) further comprises a shock protection unit (31) adapted for comparing an output signal from the electronic sensor device (28) to a first threshold value, and ceasing streaming by the transmitter (30) of the audio stream from the at least one input transducer (21), when the output signal from the electronic sensor device (28) exceeds the first threshold value.

16 Claims, 3 Drawing Sheets

(58) Field of Classification Search
CPC ..... G01P 15/0891; G01P 15/18; G06N 20/00; H04B 1/3833; G11B 19/04
See application file for complete search history.

(56) References Cited

U.S. PATENT DOCUMENTS

| | | | | |
|---|---|---|---|---|
| 2014/0241559 | A1* | 8/2014 | Mulder | H04R 3/02 381/355 |
| 2016/0087669 | A1* | 3/2016 | Kang | H04B 1/3833 455/575.8 |
| 2018/0217660 | A1* | 8/2018 | Dayal | G06N 20/00 |
| 2021/0160613 | A1* | 5/2021 | Gigandet | G10L 21/0216 |

FOREIGN PATENT DOCUMENTS

| | | |
|---|---|---|
| EP | 2 769 557 A2 | 8/2014 |
| EP | 3 566 468 A1 | 11/2019 |
| WO | 2011/157856 A2 | 12/2011 |
| WO | 2018/127298 A1 | 7/2018 |

OTHER PUBLICATIONS

Written Opinion of the International Searching Authority for PCT/EP2021/054311 dated, May 3, 2021 (PCT/ISA/237).

\* cited by examiner

AUDIO STREAMING DEVICE

The present invention relates to an audio streaming device for streaming an audio signal to at least one hearing assistive device. The invention, more particularly, relates to an audio streaming device for streaming an audio signal to at least one hearing assistive device. audio streaming device comprises at least one input transducer, and a transmitter adapted for streaming audio from the at least one input transducer. The invention relates to a method of managing an audio streaming device, too.

The purpose of the invention is to provide an audio streaming device for streaming an audio signal to a hearing assistive device and protecting the user against annoying audio caused by handling the audio streaming device.

This purpose is achieved according to the teaching of claim 1. According to a second aspect of the invention, there is provided a method of managing an audio streaming device according to claim 12. The dependent claims define various embodiments.

The invention will be described in further detail with reference to preferred aspects and the accompanying drawing, in which.

DETAILED DESCRIPTION

Figure 1:
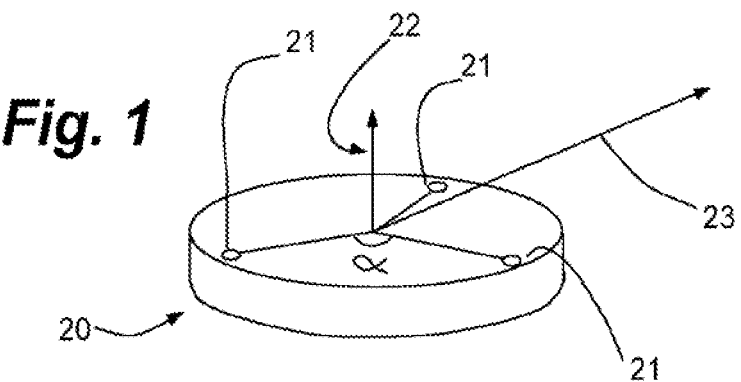
FIG. 1 shows in perspective an audio streaming device according to one embodiment of the invention.

FIG. 1 shows in perspective an audio streaming device 20 according to one embodiment of the invention. The audio streaming device 20 is in the illustrated embodiment disc-shaped but may in other embodiments assume other shapes serving the purpose. The audio streaming device 20 has a plurality of microphones 23, and in the illustrated example, the number is three. In other examples, the number may be higher or lower. When the audio streaming device 20 performs a kind of beamforming, the processing relies on a predetermined geometry, which may be as illustrated in FIG. 1. Here the center of the audio streaming device 20 is marked as the starting point for a vector 22, and the center point is equidistant from the three microphones 23 as the distances between center point and each of the three microphones 23 are equal. Furthermore, an angle, $\alpha$, defined by lines passing through the center point and respective microphones 23, is the same, 120°. The lines are equiangular as all the lines intersect at center point and makes the 120° angle.

The audio streaming device 20 may however be formed as a bar with several microphones aligned, as a semi sphere or as a ball structure with multiple (+10) microphones integrated.

A vector 23 marks a direction for beamforming performed by the audio streaming device 20. In some embodiments, the audio streaming device 20 aims to pick up audio originating from this direction and aims to remove interferences introduced by noise and reverberation originating from other directions. Beamforming can be considered as multidimensional filtering in space and time and is a method of signal processing involving spatially distributed sensors. By means of beamforming, the audio streaming device 20 aims to place a virtual microphone at various positions without physical movement. Those virtual microphones are useful for applications like conference telephony and for companion microphones picking up speech during a meeting and immediately streaming the audio signal to a set of hearing aids worn by one or more hearing impaired persons present in the meeting room. Several beamforming algorithms exist for combining the audio data, and these often rely on passing the audio signal through digital filters.

Figure 2:
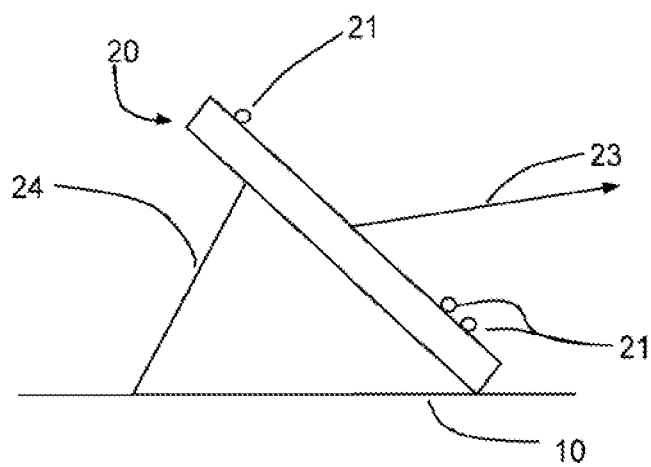
FIG. 2 illustrates a side view of the audio streaming device shown in FIG. 1 tilted relatively to ground.

FIG. 2 illustrates a side view of the audio streaming device 20 shown in FIG. 1 tilted relatively to ground. For this purpose, the audio streaming device 20 has a rest 24 that can be attached when need or is pivotally secured to the audio streaming device 20. The rest 24 may also serve the purpose as a clip for mounting the audio streaming device 20 to cloths, whereby the audio streaming device 20 can be used as a companion microphone for a hearing aid user. The rest tilts the audio streaming device 20 relatively to a base surface 10 which affects the angle between the beam direction 23 and the plane defined by the three microphones 21.

Figure 3:
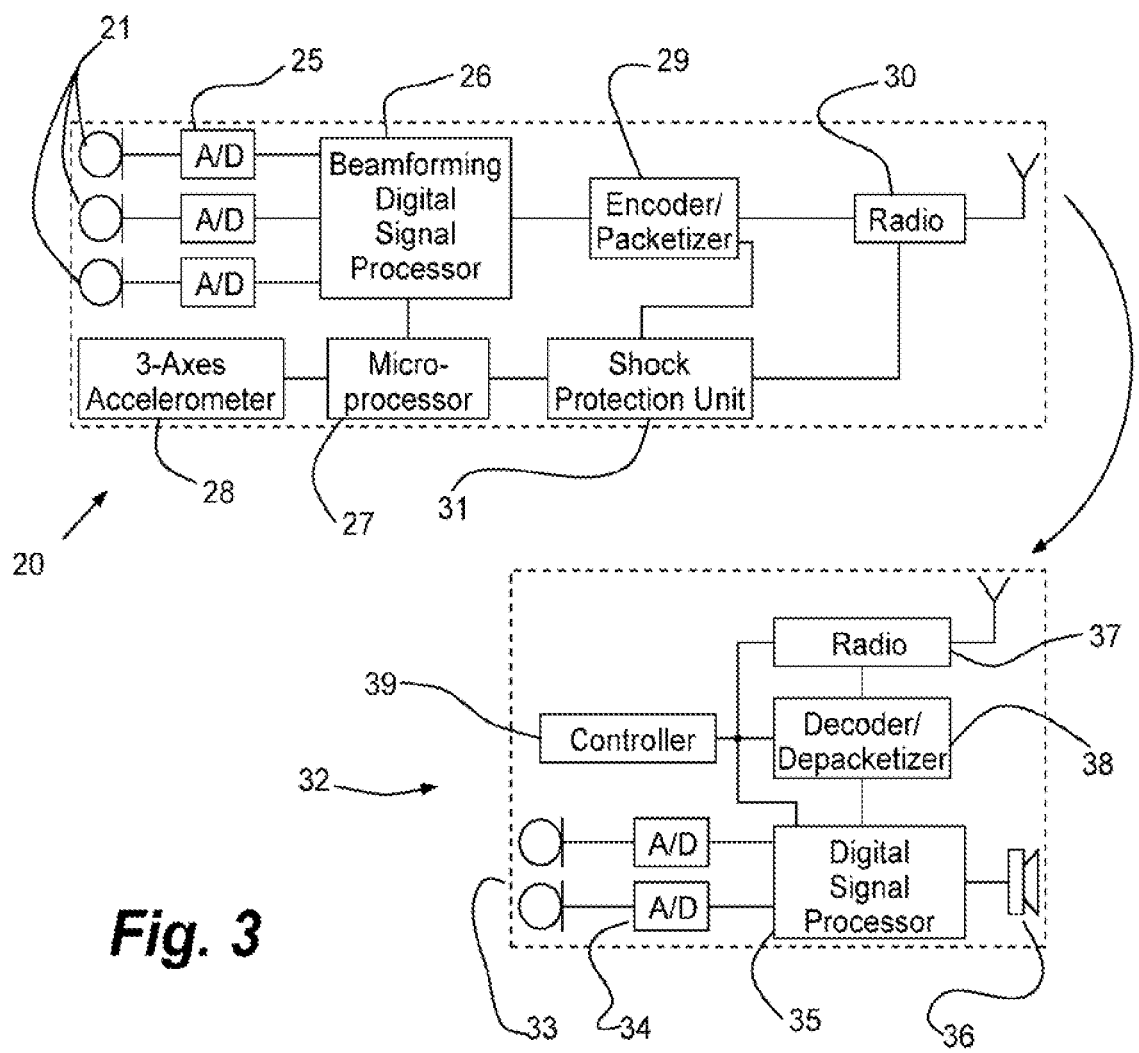
FIG. 3 illustrates schematically one embodiment of the audio streaming device and one hearing assistive device according to one embodiment of the invention.

FIG. 3 illustrates schematically one embodiment of the audio streaming device 20 and one hearing assistive device 32 according to one embodiment of the invention. The audio streaming device 20 has a plurality (e.g. 3) of microphones 21. The sound picked up is converted by the microphones 21 into an electric audio signal which by means of respective A/D converters 25 is converted into digital signal. The A/D converters 25 are in some embodiments provided by Delta-Sigma converters. The three digital audio signals originating from respective microphones are then fed to a beamforming digital signal processor 26 which processes the captured audio signals in a manner to create several acoustic beams having directions uniformly spread above the plane defined by the three microphones 21. The microphones 21 are in one embodiment omnidirectional microphones.

In the beamforming digital signal processor 26, uniformly spread beams are produced by delay-and-sum beamforming of the audio signals of pairs of the microphones 21, by applying an appropriate phase difference.

Figure 4:
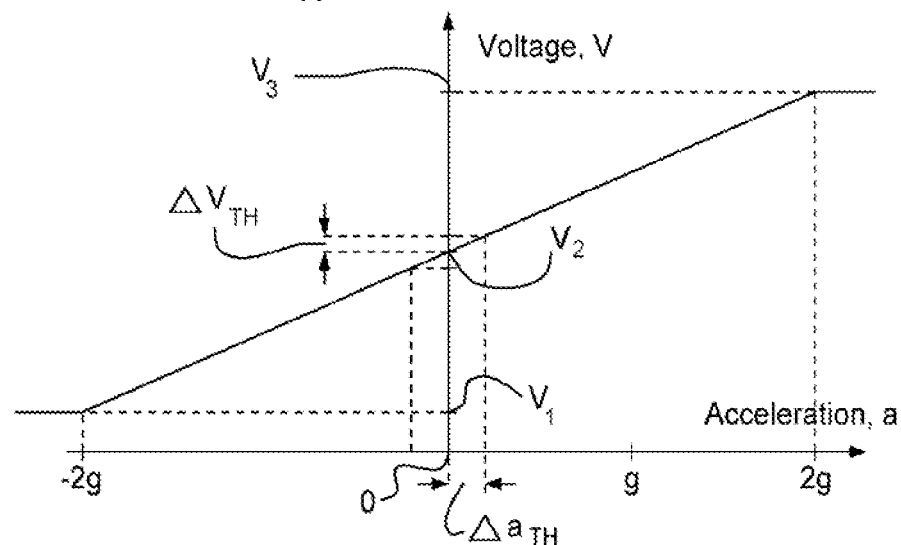
FIG. 4 illustrates the relationship between acceleration and output voltage for an accelerometer used in the audio streaming device according to one embodiment of the invention.

The audio streaming device 20 further comprises an acceleration sensor 28, e.g. a 3-axis accelerometer, and a microprocessor 27. The acceleration sensor 28 outputs a measure for the acceleration of the audio streaming device 20 along three orthogonal axes. FIG. 4 illustrates an example of such a measure, and it is seen that there is a linear relationship between acceleration and output voltage, when the acceleration in the direction measured is within the dynamic range of the accelerometer. This counts for accelerometer output for all three axes. The microprocessor 27 receives the accelerometer output for all three axes, and based on this, the microprocessor 27 calculates the overall acceleration acting on the audio streaming device 20 and the direction of the overall acceleration. When the audio streaming device 20 rests on e.g. a table, gravity will be the only contribution to the acceleration, and the orientation of the audio streaming device 20 can by means of the overall acceleration measure be determined relatively to the gravity, can be determined by combining the amount of acceleration measured along each axis. These data are forwarded to the beamforming digital signal processor 26 for use in the beam selection.

The beamforming digital signal processor 26 furthermore includes a functionality for estimating the quality of the speech present in available beams. The beamforming digital signal processor 26 furthermore comprises a beam selection functionality for selecting the one of the uniformly spread beams produced by delay-and-sum beamforming that best fulfils the criteria set for the desired beam based on the speech quality estimation and the direction of the audio source. Once the desired beam has been selected, the beamforming digital signal processor 26 is adapted to adaptively adjust the applied phase difference for the beamforming in order to maximize the speech quality present in the selected beam.

The beamforming digital signal processor 26 outputs a processed audio signal to an encoder and packetizing unit 29 in which the processed audio signal is compressed and encoded according to a predefined streaming media audio coding format in order to represent the audio signal with minimum number of bits while retaining quality. This effectively reduces the bandwidth required for transmission of the audio stream. The encoded audio signal is then placed as payload in data packets delivered a radio 30 modulating and amplifying the data packets for transmission. In one embodiment, the audio stream is transmitted according to the Bluetooth™ Core Specification Version 5.2, where the audio streaming device 20 act as audio source for one or more persons having respective audio sink devices.

The microprocessor 27 receives the accelerometer output for all three axes, and calculates the overall acceleration acting on the audio streaming device 20. From these values, the microprocessor 27 determines accelerometer measures defining a state in which the audio streaming device 20 has rested stabile on a surface for period, e.g. for more than 5 seconds. Then, the microprocessor 27 compares at least one of the detected accelerometer measures to the accelerometer measures defining the state in which the audio streaming device 20 is stationary. In case the comparison exceeds a first predetermined threshold, the microprocessor 27 assumes that the audio streaming device 20 is moved on the surface or dropped therefrom. This may create noise that will be streamed to the hearing aids.

In order to avoid transmitting annoying audio to one or more hearing aids, the microprocessor 27 is connected to a shock protection unit 31 for interfering the audio stream transmission when justified. In the embodiment illustrated in FIG. 3, the encoder and packetizing unit 29 provides a copy of the data packets delivered to the radio 30 to the shock protection unit 31, too. When the microprocessor 27, based on the output from the acceleration sensor 28, identifies an increased risk that the audio stream may contain an acoustic shock that shall be prevented from reaching the hearing aid user, the shock protection unit 31 may instruct the radio 30 to discard the next data packet from the encoder and packetizing unit 29 and use a replacement data packet from the shock protection unit 31 instead.

The replacement data packet from the shock protection unit 31 may in one embodiment be a copy of the previous data packet delivered to the radio 30 which have been buffered in the shock protection unit 31. In one embodiment, the shock protection unit 31 has an audio classifier classifying the audio sample an delivers a pre-stored audio sample matching the audio classification of the previous data packet delivered from the encoder and packetizing unit 29. In both embodiments, it is the shock protection unit 31 that compensates for the missing audio packets by means of packet loss concealment (PLC) on the transmitter side (in the audio streaming device 20).

In yet another embodiment, the shock protection unit 31 simply disables the radio 30 until the risk of sending an acoustic shock is over. Then it is up to the controller 39 to compensate for the missing audio packets by means of packet loss concealment (PLC) on the receiver side (in the hearing aid 32).

The hearing aid 32 has at least one input transducer or microphone 33 picking up an audio signal. The audio signal is digitized in an A/D converter 34, e.g. a Delta-Sigma converter, and fed to digital signal processor 35 adapted for amplifying and conditioning of the audio signal intended to become presented for the hearing aid user. The amplification and conditioning are carried out according to a predetermined setting stored in the hearing aid 32 to alleviate a hearing loss by amplifying sound at frequencies in those parts of the audible frequency range where the user suffers a hearing deficit. The amplified and conditioned audio signal is reproduced for the user via a receiver or speaker 36. The at least one microphone 33, the A/D converter 34, the digital signal processor 35, and speaker 36 provides an audio signal path with hearing loss alleviation.

Furthermore, the hearing aid 32 includes a radio 37 adapted for receiving and demodulating the audio stream received as data packets. The radio 37 may be used for inter-ear communication, or for communication with another remote device, such as the smartphone. From the radio 37, the audio stream passes a decoder and depacketizing unit 38 in which the compressed data stream becomes unpacked and decoded again. The received audio is hereafter loaded into the digital signal processor 35.

A controller 39 controls the reception of data packets and is among other responsible for packet loss concealment (PLC) which is a technique to mask the effects of packet loss in audio over IP communication. Due to multipath propagation, individual packet may be subject to poor signal to noise ratios (SNR) and therefor be corrupted by the receiver. Packet loss concealment includes a method for accounting for and compensating for the loss of voice packets by replacing the lost packet with audio content corresponding to the recently received audio packet, either playing the latest received packet once more or synthetizing an audio stream segment based on the audio packets. The controller 39 also controls mixing of the received audio stream and the audio present in the audio signal path of the hearing aid 32.

FIG. 4 illustrates the output from one of the channels in an Inertial Sensor System or an Inertial Measurement Unit (IMU), such as the acceleration sensor 28, e.g. a 3-axes accelerometer. The Inertial Measurement Unit is an electronic sensor device that provides an output from which orientation, velocity, and gravitational forces of the electronic sensor device can be calculated. By measuring the amount of acceleration due to gravity, an accelerometer can figure out the angle it is tilted at with respect to horizontal. Some accelerometers use piezoelectric effect in crystal structures that get stressed by accelerative forces generating a voltage across the structures. Alternatively, the accelerometer may operate by sensing changes in capacitance. For use as a tilt sensor and for detecting drop of the audio streaming device 20, a dynamic range of ±1.5 g is sufficient.

Figure 5:
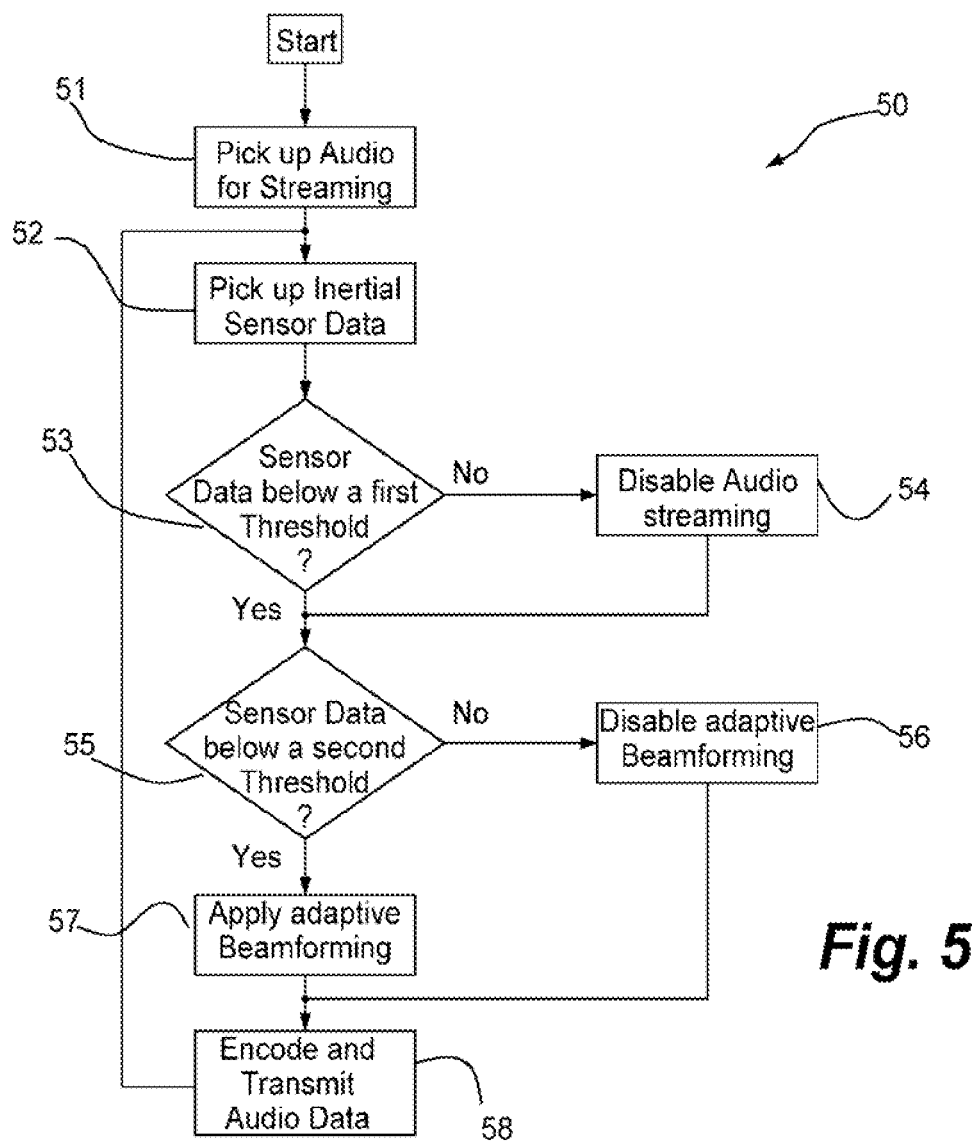
FIG. 5 illustrates a flowchart for a decision process used in a microprocessor in the audio streaming device according to the invention.

FIG. 5 illustrates a flowchart for a decision process used in the microprocessor in the audio streaming device 20 according to the invention. When the audio streaming device 20 is placed stable to a surface 10, it starts as indicated in step 51 by picking up audio signal from the environment by means of the microphones 21. In parallel hereto, the acceleration sensor 28, e.g. a 3-axes accelerometer, picks up inertial sensor data in step 52, and the microprocessor 27 compares sensor data to a first threshold in step 53. The sensor data may as discussed above consist of sensor data for each of the three axes and the total acceleration calculated from sensor data for the three axes. Any combination of the sensor data available may be compared to appropriate thresholds for detecting scratching, movements, and drops of the audio streaming device 20. In case the microprocessor 27 detects that the comparison that the sensor data exceeds the first threshold in step 53, the microprocessor 27 disables the transmission of the audio picked up in step 54. This is also the case if only one of the four parameters exceed the relevant predefined threshold.

At step 55, the microprocessor 27 compares the sensor data to a second threshold. This comparison is to ensure that the audio streaming device 20 is not moved. In case the audio streaming device 20 moves in an unpredictive manner, it does not make sense to adapt the beamforming provided in the audio streaming device 20 during the move, why the microprocessor 27 disables the adaptive beamforming in step 56. Then the audio picked up by the microphones 21 and processed by the beamforming digital signal processor 26 based on the parameters determined prior to the movement detected will be encoded and transmitted in step 58. Once the audio streaming device 20 has stopped moving and the microprocessor 27 identifies the sensor data to be below the second threshold, the microprocessor 27 instructs the beamforming digital signal processor 26 to apply adaptive beamforming again in step 57. Hereafter the audio signal will be encoded and transmitted in step 58.

The audio streaming device 20 continues picking up audio and monitoring inertial sensor data and starts using the audio data for streaming once the microprocessor 27 in step 53 detects that the sensor data is below the first threshold.

Figure 6:
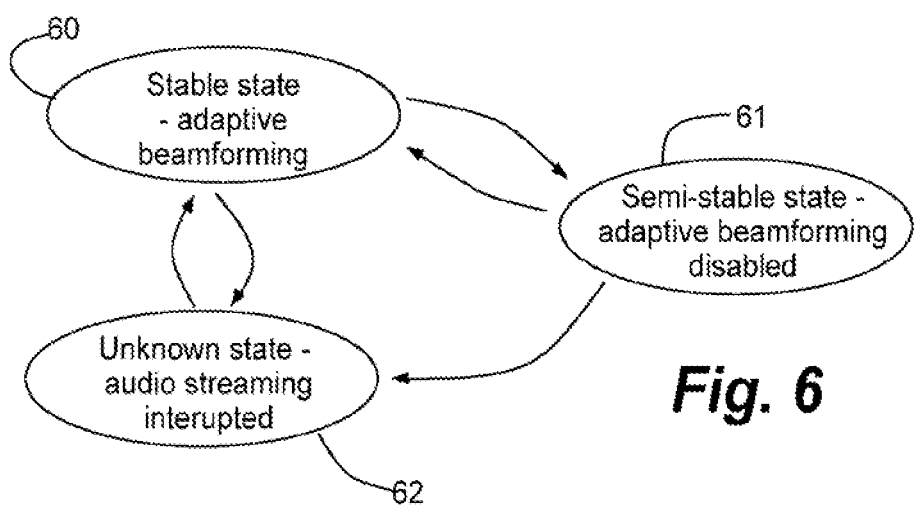
FIG. 6 illustrates a state diagram for audio streaming device according to one embodiment of the invention.

FIG. 6 illustrates a state diagram for audio streaming device 20 according to one embodiment of the invention. The audio streaming device 20 has a stable state 60 in which it acts as remote microphone, e.g. placed on a table (horizontal and no movement for a period). When movement corresponding to touching the audio streaming device 20 is detected with the acceleration sensor 28, and the microprocessor 27 observes that the sensor data exceeds a first threshold, the audio streaming device 20 enters an unknown state 62 in which audio streaming of the signal picked up by means of the microphones 21 is interrupted. The microprocessor 27 mutes the microphone 21 and/or filters out low frequencies for a short period. In some embodiments, the audio streaming device 20 applies packet loss concealment techniques on the transmitter side for masking the interrupted audio signal. The packet loss concealment techniques include Zero insertion, Waveform substitution (the missing gap is reconstructed by repeating a portion of already transmitted audio signal), or Model-based methods (an algorithm applies speech models for interpolating and extrapolating speech gaps).

In some embodiments, the transmission of the audio stream is interrupted when the audio streaming device 20 is in the unknown state 62. Then it is up to the radio 37 in the hearing aid 32 to apply packet loss concealment techniques on the receiver side.

When using a wireless technology standard, such as Bluetooth™, for exchanging data, the transmitted microphone audio will have a latency greater than 10 ms due to the applied codec. By entering the unknown state 62, the transmission of the audio stream is interrupted for e.g. 10-20 ms leaving package loss concealment on the receiver or the transmitter side to clean up the gap.

In one embodiment, a timer in the microprocessor 27 is used for setting a predefined period. If an event detected by the accelerometer 28 is over at the expiry of this predefined period, the audio streaming device 20 reverts to the stable state 60.

High-pass filtering of the audio signal picked up by the microphones 21 is initiated once the event is detected and the unknown state 62 is entered, and once the high-pass filtered audio reaches a processed stage, e.g. after 10-20 ms, the transmission of the audio stream is resumed. The filtering of microphone audio continues until a timeout is reached for either accelerometer movement or total duration of the event. A timer for tabletop detection is reset to eliminate repeat events.

FIG. 6 also illustrates that the audio streaming device 20, when being in the stable state 60 in which it acts as remote microphone, applies adaptive beamforming as the beamforming digital signal processor 26 is adapted to adaptively adjust the applied phase difference for the beamforming in order to maximize the speech quality present in the selected beam.

When a movement corresponding to touching or turning the audio streaming device 20 is detected with the acceleration sensor 28, and the microprocessor 27 observes that the sensor data exceeds a second threshold, the audio streaming device 20 enters an semi-stable state 61 in which the adaptive beamforming is interrupted. This semi-stable state 61 is maintained until the microprocessor 27 based on the sensor data deems the audio streaming device 20 to rest stable on the table again, the audio streaming device 20 reverts to the stable state 60. However, if further movements are detected, and the first threshold is exceeded, too, the audio streaming device 20 enters an unknown state 62 in which audio streaming of the signal picked up by means of the microphones 21 is interrupted. In some embodiments, the first and the second thresholds are identical.

The invention claimed is:

1. An audio streaming device for streaming an audio signal to at least one hearing assistive device, and comprising
   at least one input transducer,
   an electronic sensor device adapted for sensing gravitational forces acting on the audio streaming device, and
   a transmitter adapted for streaming audio from the at least one input transducer to the at least one hearing assistive device,
   wherein the audio streaming device further comprises a microprocessor adapted for:
   comparing an output signal from the electronic sensor device to a first threshold value, and
   ceasing streaming by the transmitter of the audio stream from the at least one input transducer, when the output signal from the electronic sensor device exceeds the first threshold value; and
   wherein the transmitter is adapted for streaming audio as data packets, and wherein a shock protection unit is adapted to instruct the transmitter to discard the next data packet and use a replacement data packet from the shock protection unit instead.

2. The audio streaming device according to claim 1, wherein the audio streaming device further comprises a digital signal processor adapted for providing beamforming based on the at least one input transducer, wherein the microprocessor is furthermore adapted for:
   comparing the output signal from the electronic sensor device to a second threshold value, and ceasing the beamforming digital signal processor to change currently set beamforming parameter, when the output signal from the electronic sensor device exceeds the second threshold value.

3. The audio streaming device according to claim 2, wherein the digital signal processor is adapted for generating a plurality of uniformly spread beams by applying appropriate phase differences in a delay-and-sum beamforming process for audio signals from the at least one input transducer.

4. The audio streaming device according to claim 2, wherein the digital signal processor is adapted for selecting one of a plurality of uniformly spread beams, the beam selected is the beam that best fulfils a criteria set based on a speech quality estimation and a direction of an audio source.

5. The audio streaming device according to claim 4, wherein the digital signal processor is adapted to adaptively adjust an applied phase difference for the selected beam in order to maximize a speech quality present in the selected beam.

6. The audio streaming device according to claim 1, wherein the electronic sensor device is adapted for providing a movement measure for an acceleration along three orthogonal axes.

7. The audio streaming device according to claim 6, wherein the electronic sensor device comprises a 3-axes accelerometer, wherein the microprocessor is adapted for calculating a measure for an overall acceleration, and wherein a shock protection unit is adapted for comparing at least one movement measure to the first threshold value, the at least one movement measure includes either the measure for the overall acceleration or the measure for the acceleration along each of the three orthogonal axes.

8. The audio streaming device according to claim 1, wherein the replacement data packet from the shock protection unit is a copy of the previous transmitted data packet.

9. The audio streaming device according to claim 1, wherein the replacement data packet from the shock protection unit is a pre-stored data packet selected by the shock protection unit among several pre-stored data packet as the pre-stored data packet best matching an audio classification of previous data packet transmitted by the radio.

10. The audio streaming device according to claim 1, wherein the transmitter is adapted for streaming audio as data packets, and wherein a shock protection unit is adapted to instruct the transmitter to suspend transmission of data packets.

11. A method of managing an audio streaming device, comprising at least one input transducer, an electronic sensor device, and a transmitter, wherein the method comprises:
    transmitting an audio stream from the at least one input transducer to the at least one hearing assistive device,
    sensing gravitational forces acting on the audio streaming device
    comparing the sensed gravitational forces to a first threshold value, and
    ceasing the transmission of the audio stream audio stream, when the sensed gravitational forces exceeds the first threshold value;
    wherein the method further comprises:
    streaming audio as data packets, and
    instructing the transmitter to discard the next data packet and use a replacement data packet from a shock protection unit instead.

12. The method according to claim 11 and comprising providing of a movement measure for the acceleration along three orthogonal axes.

13. The method according to claim 12 and comprising calculating a measure for an overall acceleration, and comparing at least one movement measure to the first threshold value, the at least one movement measure includes either the measure for the overall acceleration or the measure for the acceleration along each of the three orthogonal axes.

14. The method according to claim 11 and further comprising using a copy of the previous transmitted data packet as the replacement data packet.

15. The method according to claim 11 and further comprising selecting a pre-stored data packet among several pre-stored data packets as the pre-stored data packet best matching an audio classification of a previously transmitted data packet by the radio, and using the selected pre-stored data packet as the replacement data packet.

16. The method according to claim 11 and further comprises
    instructing the transmitter to discard the next data packet and not use a replacement data packet.

* * * * *